July 20, 1954 C. E. LOMAX ET AL 2,684,406

VOICE PAGING SYSTEM

Filed Dec. 21, 1950 6 Sheets-Sheet 1

INVENTORS.
CLARENCE E. LOMAX
ROSWELL H. HERRICK
BY
[signature]
ATTORNEY

July 20, 1954 C. E. LOMAX ET AL 2,684,406

VOICE PAGING SYSTEM

Filed Dec. 21, 1950 6 Sheets-Sheet 2

INVENTORS.
CLARENCE E. LOMAX
ROSWELL H. HERRICK

BY [signature]

ATTORNEY

VOICE PAGING SYSTEM

Filed Dec. 21, 1950 6 Sheets-Sheet 3

INVENTORS.
CLARENCE E. LOMAX
ROSWELL H. HERRICK
BY
[signature]
ATTORNEY

VOICE PAGER A

INVENTORS.
CLARENCE E. LOMAX
ROSWELL H. HERRICK
BY
Mc Walter Owen.
ATTORNEY

INVENTORS.
CLARENCE E. LOMAX
ROSWELL H. HERRICK

BY [signature]

ATTORNEY

VOICE PAGER B

INVENTORS.
CLARENCE E. LOMAX
ROSWELL H. HERRICK
BY
[signature]
ATTORNEY

Patented July 20, 1954 2,684,406

UNITED STATES PATENT OFFICE 2,684,406

VOICE PAGING SYSTEM

Clarence E. Lomax, Chicago, Ill., and Roswell H. Herrick, Lorain, Ohio, assignors to Automatic Electric Laboratories, Inc., Chicago, Ill., a corporation of Delaware Application December 21, 1950, Serial No. 201,914

20 Claims. (Cl. 179—18)

This invention relates in general to a private automatic telephone system and more particularly to voice paging systems therefor; and still more particularly it relates to systems wherein certain lines or substations only may establish voice paging calls.

Accordingly, it is the main object of the invention to provide two separate and distinct improved voice paging systems, incorporated into the overall telephone system, wherein substations having access to one of the voice paging systems may or may not have access to the other, depending on a predetermined selection.

It is another object of the invention to provide an automatically operated signalling means in each paging system for signalling occupants of certain rooms at various times of the day—such as, for example, starting and dismissal signals.

Another objetc of the invention is to provide a paging system wherein the regular trunk circuits are only used momentarily for setting up a voice paging call; the calling line then being directly connected to a voice paging system, thereby freeing the trunk circuits for regular substation to substation calls.

Another object of the invention is to provide a voice paging system wherein a voice pager or voice paging amplifier is reached from a set of terminals in the banks of a connector, all lines having access to the terminals, but only certain lines allowed to completely connect with the voice pager.

In accordance with the above enumerated objects, a feature of the invention resides in the means for allowing only certain substations to establish voice paging calls over one or both of the voice paging systems.

Another feature of the invention is the provision of a momentary signal to notify the caller that voice paging may be accomplished, while at the same time notifying the people in proximity to the voice paging loud speakers that paging immediately will follow.

Other objects and features will be evident and a complete understanding of the operation may be had from a perusal of the specification in conjunction with the accompanying drawings, in which:

Fig. 1 shows two lines associated with a regular finder circuit. Substations A and A′ can only be used for regular substation to substation calls. Substation B, by virtue of cut-in non-locking push button 47 and also by virtue of a marking on the EC bank, both features to be completely described hereinafter, can be used to initiate paging calls over voice pager A and voice pager B, as well as regular substation to substation calls. Substation B′ can only be used for regular substation to substation calls, or for voice paging calls over voice pager A.

It should be understood, of course, that only two lines and four substations are shown for illustration purposes. Likewise it should be understood that the line having substations A and A′ thereon could have been shown as having access to voice pager A by merely connecting up the EC bank in a similar manner as that shown for the line having substations B and B′ thereon. Also by providing a push-button, appropriately connected, at substations A, A′ or B′, voice paging service over voice pager B would be possible therefrom.

Figures 3, 7:
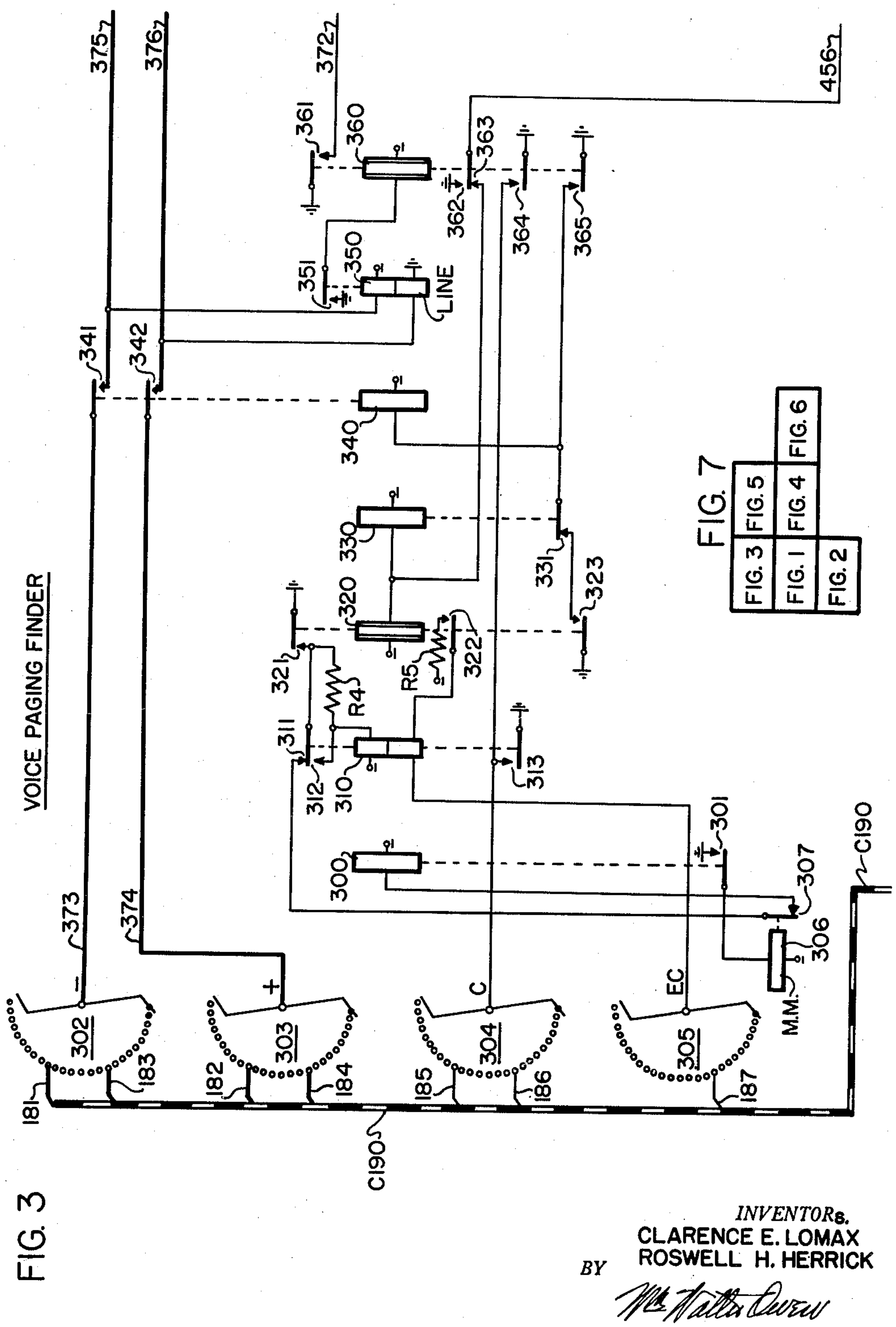
Fig. 3 shows a voice paging finder for voice pager A.
Fig. 7 shows the arrangement of the drawings.
Figure 4:
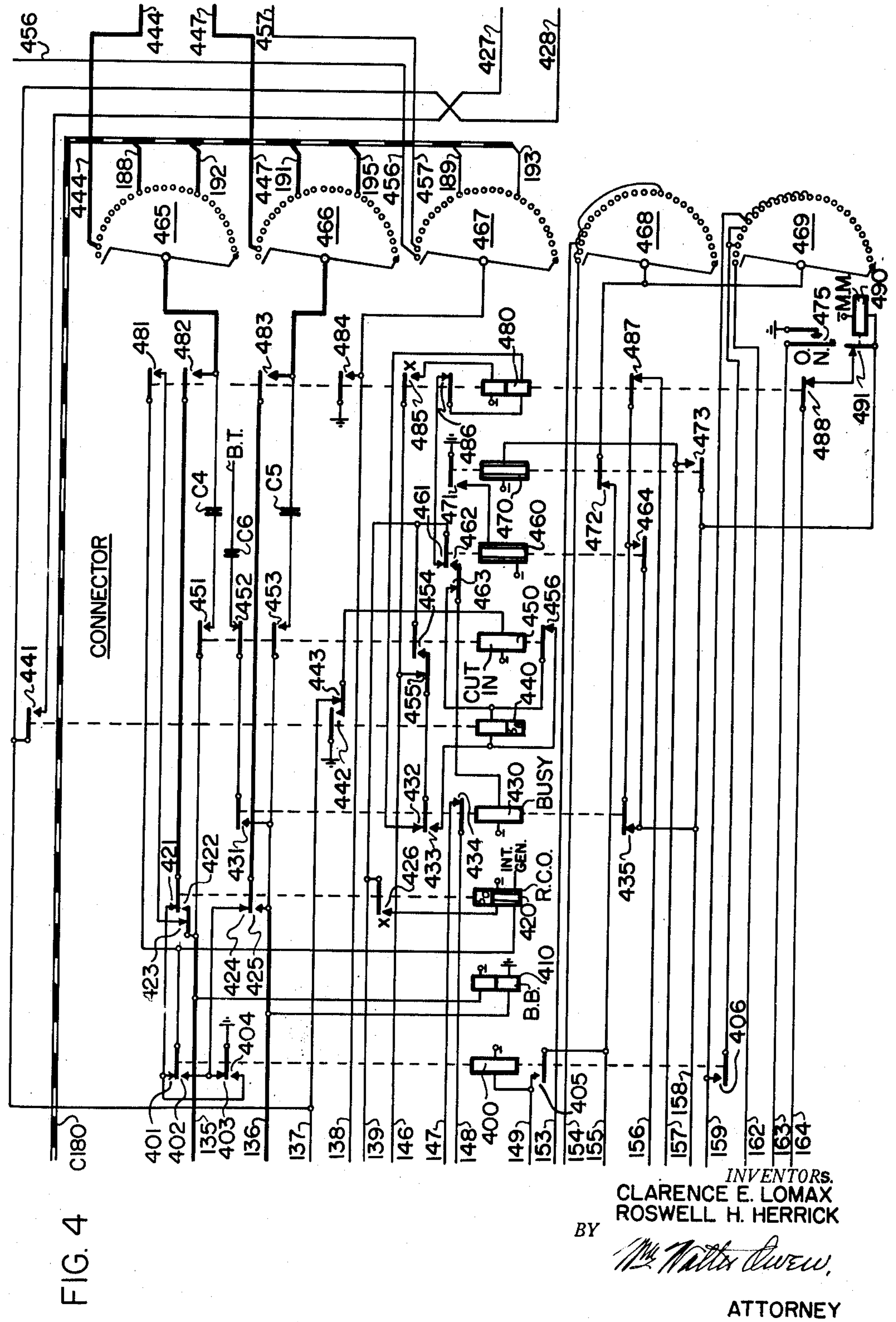
Fig. 4 shows a connector circuit.
Figure 1:
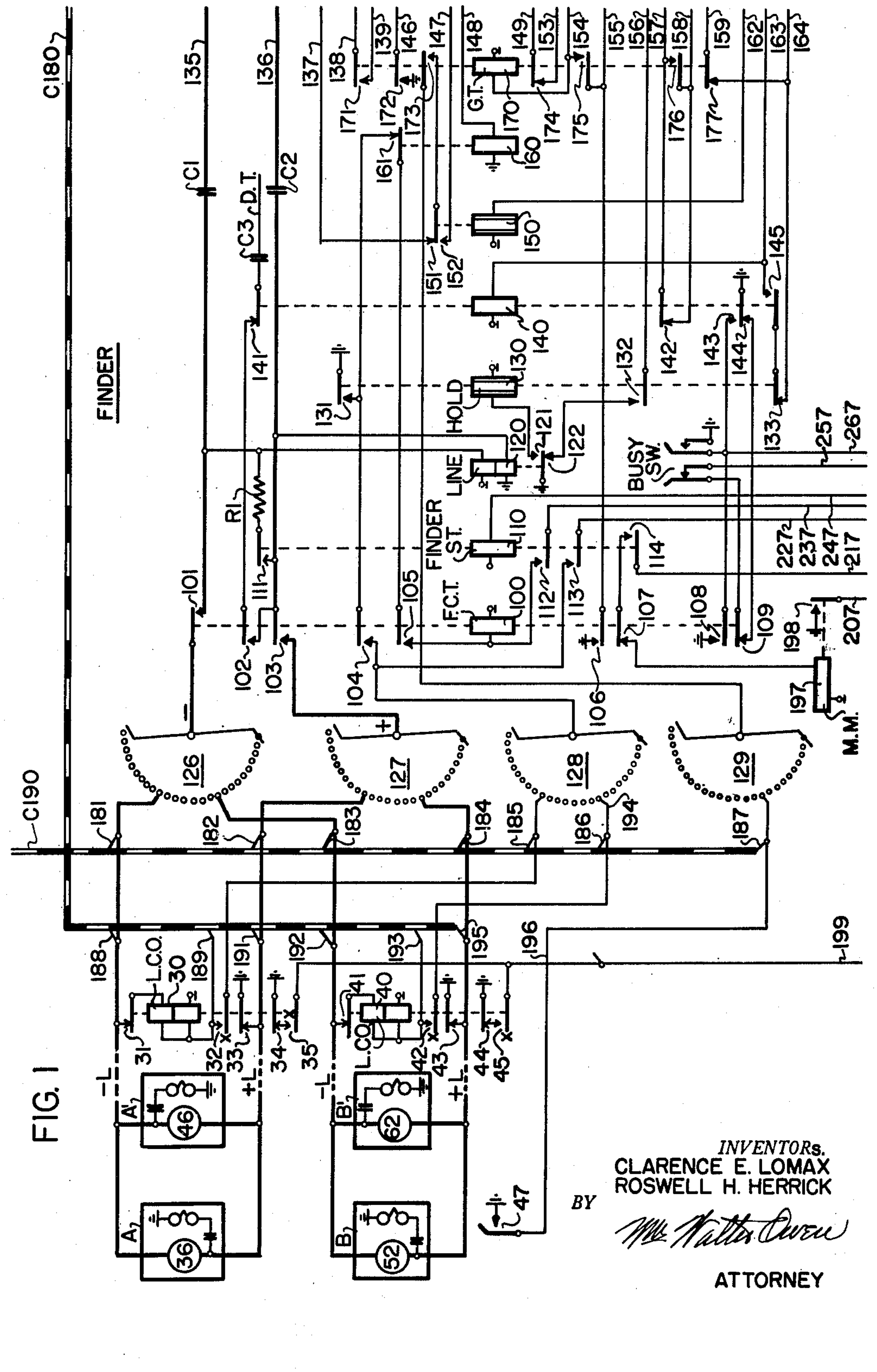
Figure 6:
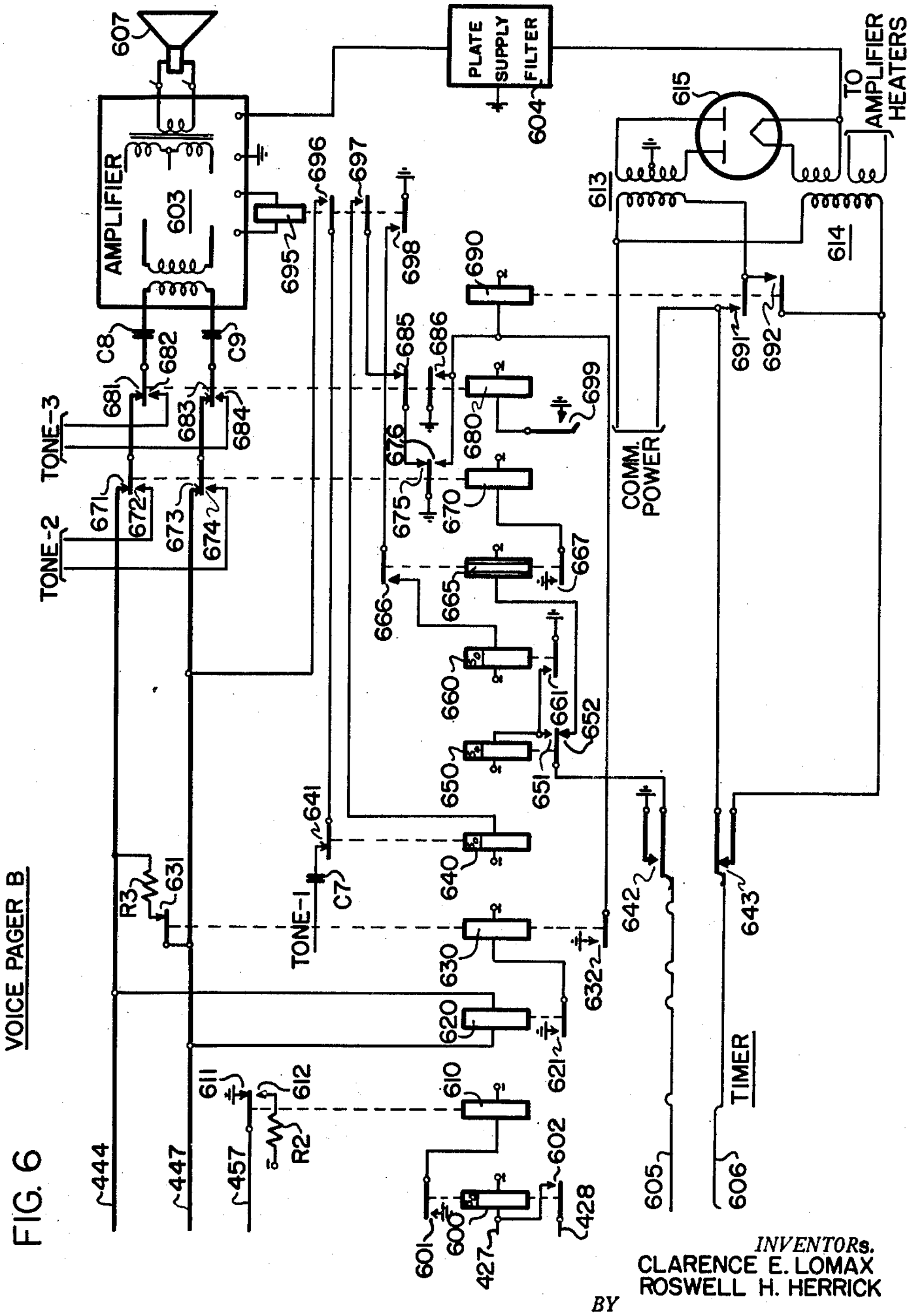
Fig. 6 shows voice pager B.

The rotary switches shown in Figs. 1, 3 and 4 may be of the type described in the pending application of Kenneth W. Graybill et al., Serial No. 654,556, filed March 15, 1946.

Briefly explained, the system includes a small 20 line regular P. A. X with two different voice paging circuits. In order to reach voice pager A or voice paging amplifier A, a calling or paging subscriber dials a certain digit, 1 in the present embodiment; whereupon the voice paging finder will be set into operation to find the calling line. Assuming now that the calling subscribed wishing to page over voice pager A is calling from a line having its associated contact in the voice paging finder EC bank marked, the voice paging finder will find that calling line. The voice paging finder automatically connects the calling line to voice pager A. The finder-connector link will then be freed for use by other lines. A momentary tone is placed on the line in order to inform the calling subscriber that he may now commence with paging and also to inform the occupants of the room wherein the voice paging loud speakers are located that the calling or paging subscriber is about to speak. In order to reach voice pager B or voice paging amplifier B a calling or paging subscriber dials a certain digit, two in the present embodiment; whereupon the connector will step to the second set of contacts to connect to voice pager B. However the voice paging circuit is normally marked busy. Assuming now that the calling subscribed is calling from a substation equipped with a "cut-in on busy" push button, the normal busy condition of voice pager B will be removed for subsequent paging. A momentary tone is then transmitted to both the calling subscriber and to the people in proximity to the voice paging loud speakers for similar reasons as set forth hereinbefore. Thus it can be seen that there are two independent restricted voice paging circuits; one utilizing a regular finder-connector link momentarily while the other utilizes it throughout paging.

The maximum number of lines served by the illustrated exchange is 20 lines, as stated hereinbefore, and the number of finder-connector links may be limited to not more than four. Two lines have been shown with two parties each and are so arranged as to be rung on the opposite sides of the lines. Each substation comprises the well-known elements, namely, dial, receiver, transmitter, and ringer. Only the ringer connection at each substation has been shown, and a designation illustrating the substations' call numbers. All regular numbers are two digit numbers, and assuming that a full capacity of 20 lines are in use and that each line has two parties thereon, the call numbers will be arranged in the following order: the digits 31 to 30 and 41 to 40 will be used for the first group of ten lines and the digits 51 to 50 and 61 to 60 will be used for the second group of ten lines. The digits 31 to 30 and 51 to 50 will cause the ringing voltage source to be applied to the positive line conductors and the digits 41 to 40 and 61 to 60 will cause the ringing voltage source to be applied to the negative line conductors.

A rotary switch having twenty-six positions with twenty-five bank contacts have been utilized wherever applicable in the exchange. The twenty-six position is the normal "home" position for the wipers, while the first and second contacts of the connector rotary switch may be used for either voice paging over voice pager A or for voice paging over voice pager B, respectively. The third and fourth contacts of the same switch are utilized for the first digit of the called number when dialling the first group of ten lines and the 15th contact is used as a stopping point for the first digit of the called number when dialling the second group of ten lines. Thus, it can be seen that the first group of ten lines uses contacts five through fourteen and the second, or last, group of ten lines uses contacts sixteen through twenty-five. The regular finder rotary switch as well as the voice paging finder rotary switch are of the non-numerical type and therefore do not use the twenty-sixth or "home" position, whereas, the connector rotary switch is numerical and therefore uses its "home" position.

Referring to Fig. 1, the combined line and cut-off relays, such as 30 and 40, are actually two step relays having two separate and distinct operations, the first operation closing only the "X" contacts and the second closing the remaining contacts. The first operation compares with that of a line relay and the second operation with that of a cut-off relay.

Figure 2:
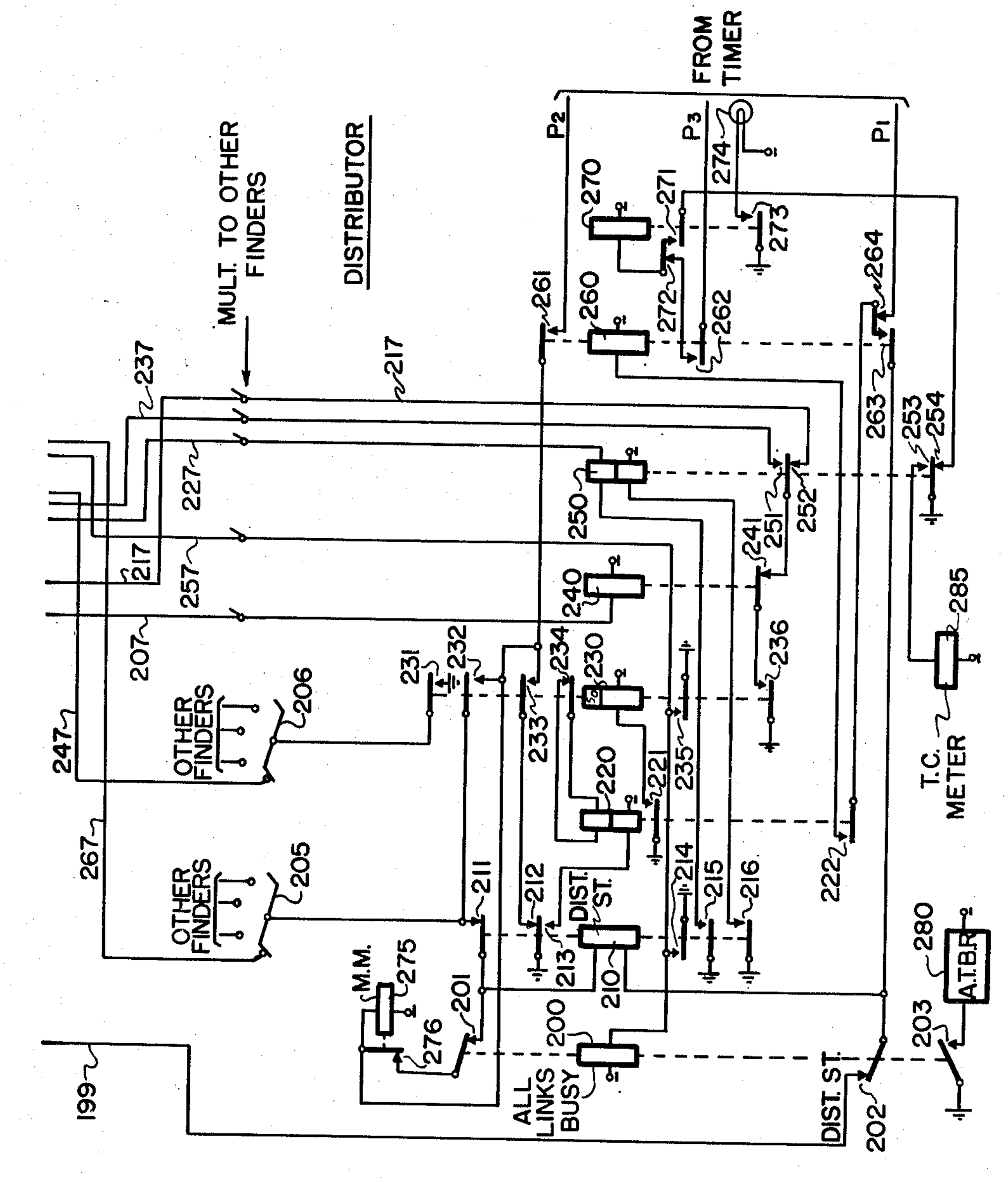
Fig. 2 shows a distributor for the finder circuits.

Referring to Fig. 2, the distributor as shown is of the rotary type, pre-selecting the next free or idle finder connector link after each operation. Therefore, during normal operating periods of the exchange, the wipers of the rotary distributor switch will be resting on an idle link.

In order to completely understand the invention, a detailed description of the three principal types of services, namely, regular substation to substation calls, voice paging calls over voice pager A, and voice paging calls over voice pager B, will now be given.

*Regular P. A. X service*

Assuming that substation A has been assigned call number 36 a call thereto from substation B will be accomplished in the following manner:

When a subscriber at substation B removes the receiver a loop is closed across the talking conductors completing a circuit to the line and cut-off relay 40. Relay 40 therefore operates over the following circuit: ground at contacts 43, line conductor +L, over subscriber's loop at substation B, line conductor —L, contacts 41, through upper winding of relay 40, through lower winding of relay 40 to battery. As previously stated, relay 40 is a two-step line and cut-off relay having two serially connected windings, operating "X" contacts 42 and "X" contacts 45 responsive to the initial energization. Relay 40, in closing "X" contacts 42, causes battery potential to be applied to control conductor 194. Relay 40 also, in closing contacts 45, causes ground potential to be applied to the distributor start conductor 199 for completing a circuit to the distributor start relay 210. Relay 210 therefore operates over the following circuit: ground at contacts 44, contacts 45, distributor start conductor 199, contacts 202, through distributor start relay 210, contacts 201, 276, through distributor motor magnet 275 to battery. Motor magnet 275 will not operate in series with distributor start relay 210. As previously mentioned the distributor is of the rotary type and after each operation pre-selects the next idle or free finder connector link. Wipers 205 and 206 will therefore rest on an idle or free link if a free trunk is at this time available. However, if all links are busy at this time, the operating circuit of the all-links-busy relay 200 would be open. The all-links-busy relay 200 normally operates over the following path: ground from any idle or free link, such as at contact 144 in the illustrated link, contacts 169, busy switch, conductor 257, through all-links-busy relay 200 to battery. Relay 200 will restore when all links are busy and cause the circuit to motor magnet 275 to be opened at contacts 201, thereby preventing motor magnet 275 from operating and opening the circuit of relay 210 at contacts 202. As soon as a link becomes free, the ground potential is restored to the conductor 257 and all-links-busy relay 200 operates again and prepares the circuit to motor magnet. The operating circuit for motor magnet 275 will be completed if wiper 205 is resting on a contact of a busy finder. The motor magnet 275 will then operate and step the finder distributor rotary switch to an idle link.

Returning now to the operation of relay 210, the opening of contacts 211 opens a point in the energizing circuit of motor magnet 275. Relay 210, in closing contacts 213, completes a circuit for relay 220 which is slightly slow-to-operate due to its short circuited upper winding; in closing contacts 214, applies ground to the multiple circuit for maintaining relay 200 operated, in closing contacts 215, prepares an operating circuit for relay 250; and in closing contacts 216 completes an obvious pre-energizing circuit for relay 250. Relay 220, in operating and therefore closing contacts 221, completes a circuit for the slow-to-operate relay 230; and in closing contacts 222, prepares a circuit for relay 260. Relay 230 therefore operates and, in closing contacts 231, completes a circuit to the finder start relay 110 (Fig. 1), over the following path: ground at contacts 231, wiper 206, conductor 247, through finder start relay 110 to battery. Relay 230, in closing contacts 232, prepares a circuit for motor magnet 275, in closing contacts 233, prepares a "kick off" circuit for motor magnet 275; in opening contacts 234, opens the circuit for the upper winding of relay 220, thereby conditioning relay 220 for a normal quick restoring time interval; in closing contacts 235 applies another ground to the multiple circuit for maintaining 200 energized; and in closing contacts 236, prepares circuits for voice paging finder motor magnet 197 and finder cut-through relay 100.

Relay 110 therefore operates and, in closing contacts 111 completes an obvious circuit for line relay 120 through resistor R1. Relay 110, in closing contacts 112 prepares a circuit for the finder cut-through relay 100; in closing contacts 113, prepares a circuit for the preenergized relay 250; and in closing contacts 114, completes a circuit for motor magnet 197. Line relay 120 therefore operates and, in closing contacts 121, completes an obvious circuit for the slow-to-release hold relay 130. Hold relay 130 therefore operates and, in closing contacts 131, prepares a circuit for operating the line and cut-off relay 40 completely; in closing contacts 132, prepares a pulsing circuit to the connector motor magnet 490; and in opening contacts 133, opens a point in the self-interrupted circuit of motor magnet 490. Meanwhile, finder motor magnet 197 operates over the following path: ground at contacts 236, contacts 241, 252, conductor 217, contacts 114, 107, through finder motor magnet 197 to battery. Motor magnet 197, in operating, completes an obvious circuit to the interrupter relay 240 at contacts 198. Relay 240 therefore operates and, in opening contacts 241, opens the previously traced operating circuit for motor magnet 197, allowing said magnet to restore. In restoring, magnet 197, being of the indirect drive type, advances finder rotary wipers 126, 127, 128 and 129, one step; and in opening contacts 198, opens the circuit to relay 240. Relay 240 therefore restores and again completes the operating circuit to magnet 197 by way of contacts 241. Magnet 197 re-energizes and at contacts 198 again completes the circuit to relay 240. Relay 240 operates and at contacts 241 opens the circuit to magnet 197, allowing it to restore. In restoring, magnet 197 advances wipers 126, 127, 128 and 129 a second step; and at contacts 198 again opens the circuit to relay 240, allowing it to restore. This relay interrupted operation continues until wiper 128 engages the bank contact terminating the control conductor 194; at which time a circuit is completed for the preenergized relay 250, over the following path: ground at contacts 215, through upper winding of relay 250, conductor 227, contacts 113, wiper 128, conductor 194, contacts 42, through lower winding of relay 40, to battery. Calling line B has now been found. Relay 250 operates and, in opening contacts 252, opens the operating circuit of motor magnet 197, thereby preventing it from operating. Wipers 126 to 129 will now be resting on the contacts of calling line B.

Relay 250, in closing contacts 251, completes a circuit to the finder cut-through relay 100, over the following path: ground at contacts 236, contacts 241, 251, conductor 237, contacts 112, through finder cut-through relay 100 to battery. Relay 250 also, in closing contacts 253, completes an obvious circuit to the total call meter 285; and in opening contacts 254, opens the locking circuit of relay 270. Finder cut-through relay 100 therefore operates and, in closing contacts 101 and 103, connects the talking conductors of calling line B to the finder connector link. Relay 100, in closing contacts 102, completes a circuit for transmission of dial tone back out over the positive talking conductor to the calling station B for indicating to the calling subscriber that he may proceed with dialling. Relay 100, in closing contacts 104, completes a circuit for completely energizing line cut-off relay 40, over the following path: ground at contacts 131, contacts 104, wiper 128, conductor 194, "X" contacts 42, through the lower winding of relay 40 to battery. The operation of contacts 104 also shunts the upper winding 250, but relay 250 once operated will remain so by the holding effect of its lower winding. The ground potential at contacts 131 also busies line B to other finders and is applied to the rotary connector switches in order to busy the link to incoming calls over the following path: ground at contacts 131, contacts 104, wiper 128, conductor 194, "X" contacts 42, conductor 193, cable C 180, conductor 193 to the control bank contact on the connector bank. Relay 100, in closing contacts 105, completes an obvious holding circuit for itself by way of ground on contacts 131 through contacts 161. Relay 100, in closing contacts 106, prepares a future locking circuit for relays 170 and 400, and supplies a working ground for various other relays in the finder connector link. Relay 100, in opening contacts 107, opens another point in the circuit of finder motor magnet 197; and in closing contacts 108, completes a circuit for energizing distributor motor magnet 275, over the following path: ground on contacts 108, conductor 267, wiper 205, contacts 232, through motor magnet 275 to battery. Distributor motor magnet 275 therefore operates.

Relay 40, in operating completely (second step) and therefore opening contacts 41 and 43, opens its previously traced (first step) operating circuit; and in opening contacts 44 removes ground from the distributor start conductor 199. Distributor start relay 210, circuit having been traced hereinbefore, therefore restores. In restoring, and therefore closing contacts 211, relay 210 closes a point in the normal operating circuit of distributor motor magnet 275. Relay 210, in restoring and in therefore opening contacts 213, opens the energizing circuit to relay 220 causing it to restore. Relay 210, in restoring and opening contacts 214, removes a ground from the multiple circuit of all-links-busy relay 200; in opening contacts 215, removes ground from the previously opened circuit of relay 250; and in opening contacts 216, opens the pre-energizing and hold circuit of relay 250, allowing it to restore. Relay 250, in restoring and therefore opening contacts 251 opens the previously traced energizing circuit of relay 100. Relay 250 also, opening contacts 253, opens the circuit to meter 285. Relay 100, however, remains energized over its previously traced locking circuit. Relay 220, in restoring and therefore opening contacts 221, opens the energizing circuit of relay 230. Relay 230 therefore restores and, in opening contacts 231, opens the previously traced circuit to finder start relay 110. Relay 230 also in restoring and opening contacts 232 opens the holding circuit for distributor motor magnet 275, allowing magnet 275 to restore. Motor magnet 275, being of the indirect drive type, rotates its wipers one step. Relay 230, in restoring and therefore opening contacts 235, removes a ground from the multiple circuit to all-links-busy relay 200; and in opening contacts 236, further opens a point in the operating circuit of finder motor magnet 197. Assuming that wiper 205 has stepped to a busy link, distributor motor magnet 275 will rotate its wipers until wiper 205 encounters a contact (corresponding to an idle finder connector link) having no ground potential thereon. Motor magnet 275 would operate, self interrupted, over the following path: ground on a busy contact (if busy), wiper 205, contacts 211, 201, 276, through motor magnet 275 to battery. The distributor will then be conditioned to handle a future call.

Relay 110 therefore restores and, in opening contacts 111 removes the bridge from line relay 120. Relay 120, however, remains operated over the closed loop at substation B, as wipers 126 and 127 are now connected thereto. Relay 110, in restoring and therefore opening contacts 112, further opens the initial energizing circuit of finder start relay 100. Relay 100, however, remains operated over the previously traced circuit via contacts 131, 161 and 105. Relay 110, in restoring and therefore opening contacts 113, further opens the energizing circuit of relay 250; and in opening contacts 114, further opens the energizing circuit of finder motor magnet 197.

The subscriber at substation B, upon hearing dial tone, proceeds to dial. As the number assigned to substation A is 36, the tens digit 3 is, of course, dialled first. Line relay 120 therefore responds to the opening and closing of the subscriber's loop circuit and restores and operates three times. Responsive to each restoration of line relay 120, caused by dialling, contacts 121 will open. Hold relay 130, being of the slow-to-release type, will remain energized throughout this dialling period. Each time line relay 120 restores contacts 122 will be closed (a total of three times) and completes a circuit to relay 470 and connector motor magnet 490, over the following path: ground at contacts 122, contacts 132, conductor 156, contacts 487, 435, to the left over conductor 158, contacts 142, conductor 157, through the winding of relay 470 to battery; and from ground at contacts 122, contacts 132, conductor 156, contacts 487, 435, through connector motor magnet 490 to battery. Relay 470 therefore operates and, in closing contacts 471, completes an obvious energizing circuit for relay 460; in opening contacts 472, removes ground from wipers 468 and 469 during the pulsing period; and in closing contacts 473, completes a circuit for itself effective during pulsing, independent of the busy relay contacts 435. Motor magnet 490 energizes and, at contacts 491, opens a point in its interrupter circuit. Motor magnet 490 will, of course, operate three times responsive to each deenergization of line relay 120. Relay 470 and relay 460, being of the slow-to-release type will however both remain operated during the dialling period. Relay 460, in closing contacts 462, prepares a circuit to busy relay 430; and in closing contacts 464, maintains the pulsing circuit complete.

As previously stated, wipers 465 to 469, inclusive, are resting on the "home" or twenty-sixth position of the rotary switch actuated by connector motor magnet 490; therefore, as magnet 490 restores responsive to the first pulse, wipers 465 to 469 are advanced one step. Off-normal springs 475 close as the wipers leave their home position and complete a circuit to relay 140 via conductor 163. Relay 140 therefore operates, and in opening contacts 141, removes dial tone from the calling line; in opening contacts 142, opens the original energizing circuit for relay 470; and in closing contacts 143, applies ground to conductor 267 to mark this finder as busy to the distributor. Relay 140 in operating, and therefore closing contacts 145, prepares the self-interrupter circuit of connector motor magnet 490. It can be seen that the second dial pulse will energize relay 470 through contacts 473 instead of the now open contacts 142. The second and third pulses operate the motor magnet over the circuit previously traced.

At the end of the third pulse, line relay 120 again energizes and opens the circuit to magnet 490 at contacts 122. Magnet 490, in restoring, rotates wipers 465 to 469 a third step to the third contact of each bank. The dialling of the tens digit 3 is now completed and the circuit to relay 470 has been opened at contacts 122, causing relay 470 to restore. Relay 470, in restoring and therefore opening contacts 471, opens the energizing circuit to relay 460; in closing contacts 472, restores ground to wipers 468 and 469 for completing a circuit to relay 400. Relay 400 therefore operates, over the following path: ground at contacts 106, conductor 155, contacts 472, wiper 468 and the third contact, conductor 153, contacts 174, conductor 149, through relay 400 to battery. Relay 460, in restoring and therefore closing contacts 461, prepares a circuit for the lower winding of relay 480; and in opening contacts 462, opens the circuit to busy relay 430.

Relay 400, in operating and therefore closing contacts 402 and 404, prepares a ringing circuit over the positive talking conductor for later ringing the subscriber at substation A. As the ringer for substation A' is on the negative talking conductor, it will not operate. Relay 400, in closing contacts 405, completes its own energizing circuit from ground at contacts 106 via conductor 155; and in closing contacts 406, completes a circuit to motor magnet 490. Motor magnet 490 therefore operates over the following path: ground at contacts 106, conductor 155, contacts 472, wiper 469 and its engaged third contact, contacts 406, conductor 159, contacts 177, conductor 164, contacts 488, 491, through motor magnet 490, to battery. Motor magnet 490 in operating, opens its own energizing circuit at contacts 491 and thereby restores. The wipers 465 to 469 therefore step to the fourth contact. Contacts 491 close once again but as the fourth contact on bank 469 is not connected the energizing circuit to motor magnet 490 remains open. However, when wiper 468 engages the fourth contact a circuit is completed to relay 170, over the following path: ground at contacts 106, conductor 155, contacts 472, wiper 468 and its engaged fourth contact, conductor 154, through relay 170 to battery.

Relay 170 therefore operates and, in closing contacts 171, prepares a circuit for cut-through relay 480; and in closing contacts 173, prepares a circuit for "cut-in on busy" service which will be discussed hereinafter. Relay 170, in opening contacts 174, opens the initial energizing circuit for relay 400; and in closing contacts 175, completes a locking circuit for itself from ground on contacts 106. Relay 170, in closing contacts 176, prepares a circuit for relay 470; and in opening contacts 177, opens the line group interrupter circuit to motor magnet 490.

The system is now conditioned for subsequent dialling of the second, or units, digit, namely 6 in the present illustration. Responsive to dialling, line relay 120 will deenergize and energize six times. Each time line relay 120 restores, responsive to each of the six pulses, contacts 121 will open. Relay 130, being of the slow-to-release type, will again remain energized during the dialling period of the second digit. Responsive to the first pulse of the second digit, relay 120 restores and therefore closes contacts 122, energizing motor magnet 490 and relay 470 over the following path: ground at contacts 122, contacts 132, conductor 156, contacts 487, contacts 435, to the left over conductor 158, contacts 176, conductor 157, through relay 470 to battery; and from ground at contacts 122, contacts 132, conductor 156, contacts 487, 435, to the right and through connector motor magnet 490 to battery. Relay 470, in operating and closing contacts 471, completes a circuit to relay 460; in opening contacts 472, removes ground potential from wipers 468 and 469; and in closing contacts 473 provides a different operating circuit for itself. Connector motor magnet 490, in operating and opening contacts 491, opens a point in its interrupter circuit. At the end of the first pulse line relay 120, of course, operates and opens the circuit for relay 470 as well as motor magnet 490. Relay 470, being of the slow-to-release type, will remain operated. Relay 460, in closing contacts 462, prepares a circuit for busy relay 430, and in closing contacts 464 maintains the pulsing circuit in case busy relay 430 should operate before pulsing is completed. The succeeding five pulses will operate connector motor magnet 490 over the circuit previously traced. Wipers 465 to 469 have now stepped six additional steps to the tenth contact in the banks. Relay 470 will restore and, in opening contacts 471, opens the circuit to relay 460; in closing contacts 472, restores ground to wipers 468 and 469; and in opening contacts 473, opens the holding circuit to relay 470. During the time wipers 467 first engages its tenth contact and before relay 460 has restored a busy test of the called line (36) is made. If the called line should be busy a ground potential would be impressed on the control bank contact. This ground would be encountered by wiper 467 to operate relay 430, over the following path: ground on wiper 467, conductor 138, contacts 171, conductor 139, contacts 462, through busy relay 430 to battery. Relay 430 would therefore operate and, in closing contacts 431, would cause busy tone to be transmitted back out over the positive talking conductor to inform the calling subscriber of the busy condition. However, in the present illustration it will be assumed that the called line (36) is not busy and therefore no ground will be encountered by wiper 467 to operate busy relay 430.

Relay 460, in restoring and therefore opening contacts 462 and closing contacts 461, completes a circuit to the cut-through relay 480, over the following path: ground at contacts 172, conductor 146, contacts 455, 432, through lower winding of relay 480, contacts 486, 461, conductor 139, contacts 171, conductor 138, wiper 467 and its engaged tenth contact, conductor 189, cable C180, conductor 189, through line cut-off relay 30 to battery. Relay 30 therefore operates and, in opening contacts 31, opens the circuit to its upper winding; in opening contacts 33, removes ground from the positive talking conductor; in closing contacts 32, busies line 36 at the finder banks; and in opening contacts 34, prevents ground from starting the distributor. Relay 480, therefore operates and closes "X" contacts 485 initially for completing a locking circuit for itself, over the following path: ground at contacts 172, conductor 146, "X" contacts 485, through relay 480 to battery. Relay 480 in operating, and therefore closing contacts 481, prepares a circuit for ring back tone; and in closing contacts 482 and 483, connects the talking conductors to the connector wipers. A circuit is now completed for ringing the subscriber at substation A, over the following path: ground at ringer at substation A, assocaited condenser, positive talking conductor +L, conductor 191, cable C180, conductor 191, wiper 466, contacts 483, 424, 402, through the lower winding of ring cut-off relay 420 to interrupter generator. Relay 400, in closing contacts 484, applies ground for preparing a circuit through the upper winding of relay 420; and also provides an additional busy ground on the control conductor of substation A. Relay 480, in opening contacts 486, opens its original energizing circuit; in opening contacts 487, opens the pulsing circuit; and in opening contacts 488, opens the interrupter circuit to motor magnet 490.

Upon hearing the ringer, the subscriber at substation A removes the receiver. The switchhook (not shown) is therefore operated and completes a circuit through the lower winding of ring cut-off relay 420, over the following path: ground at contacts 404, 421, 482, wiper 465 and its engaged tenth contact, conductor 188, cable C180, conductor 188, negative talking conductor −L, closed loop at substation A, positive talking conductor +L, conductor 191, cable C180, conductor 191, wiper 466, contacts 483, 424, 402, through lower winding of relay 420 to battery. Relay 420 operates and locks itself through contacts 426 over the following path: ground at contacts 484, conductor 138, contacts 171, conductor 139, "X" contacts 426, through upper winding of relay 420 to battery. Relay 420, in operating and therefore opening contacts 423 and 424, removes ring back tone and ringing current from the calling and called lines respectively; and in closing contacts 422 and 425, connects the back bridge relay 410 across the called line. The system is now conditioned for conversation between the subscriber at substation B and the subscriber at substation A, the complete talking circuit being traced over the following path: loop circuit at substation B, positive talking conductor +L, finder wiper 127, contacts 103, condenser C2, conductor 136, contacts 425, contacts 483, connector wiper 466 and its engaged tenth contact, conductor 191, cable C180, conductor 191, positive talking conductor +L, loop circuit at substation A, negative talking conductor −L, conductor 188, cable C180, conductor 188, connector wiper 465, contacts 482, 422, conductor 135, condenser C1, contacts 101, finder wiper 126 negative talking conductor −L, and back to the loop circuit at substation B. Line relay 120 supplies talking battery for the calling line while battery at back bridge relay 410 supplies talking battery for the called line.

Upon completion of the conversation, both subscribers will of course replace their receivers. The system will be released in the following manner: Line relay 120 will restore as its previously traced energizing circuit will now be open at the switchhook at substation B. Relay 130 will of course release as its energizing circuit will now be open at contacts 121. Relay 130, in restoring and therefore opening contacts 131 opens the previously traced locking circuit for relay 100; and in closing contacts 133, prepares the self-interrupted "homing" circuit for motor magnet 490. The removal of ground on contacts 131 also releases line and cut-off relay 40, energizing circuit therefor having been traced hereinbefore. Relay 100, in restoring and therefore opening contacts 106, opens the locking circuits of relays 170 and 400, said circuits having been traced hereinbefore. Relay 100, in opening contacts 108, removes ground from guard lead 267. Relay 170 therefore restores and, in opening contacts 172 and 171, opens the energizing circuits for relays 420 and 480, said circuits having been traced hereinbefore. Relay 480 therefore restores and, in opening contacts 484, opens the circuit to relay 30. Relay 480, in restoring, closes contacts 483 and completes the "homing" circuit of magnet 490, over the following path: ground at off-normal springs 475, conductor 163, contacts 145, 133, conductor 164, contacts 483, 491, through connector motor magnet 490 to battery. Motor magnet 490 therefore operates intermittently in an obvious self-interrupted well-known manner by opening its circuit at contacts 491. Motor magnet 490 will step wipers 465 to 469 to the twenty-sixth or "home" position at which time off-normal springs 475 opens its energizing circuit. Relay 140 also restores as its energizing circuit is opened at contacts 475. Relay 420 restores when the called subscriber at substation A replaces the receiver, the energizing circuit having been traced hereinbefore. Back bridge relay 410 will restore when its energizing circuit is opened by the restoration of relay 420. The entire system is now released and is conditioned for further service.

*Voice paging over voice pager A*

Voice paging by the subscriber at substation B over voice pager A will now be considered. It will be remembered that in order for a subscriber to page over voice pager A the substation utilized must have its EC contact in the voice pager finder banks appropriately marked. It will also be remembered that the digit 1 must be dialled initially in order to obtain access to voice pager A. Voice paging by a subscriber at substation B (as its associated contact in the EC bank of the voice paging finder is marked) will be considered. The operation of the system up to and including the dialling of the digit 1 is similar to that described in the previous section.

A short review upon completion of dialling the digit 1 will reveal that wipers 465 to 469 have been advanced to engage their respective first contacts; relay 470 has restored contacts 472 and completed circuits to relays 170 and 150 and also opened the circuit to relay 460. Relay 150 operates over the following path: ground at contacts 106, conductor 155, contacts 472, wiper 469 and engaged first contact, conductor 162, through relay 150 to battery. Relay 460, in restoring and therefore closing contacts 461, completes a circuit for the lower winding of relay 480 to operate in series with parallel connected relays 320 and 330 (Fig. 3), over the following path: ground at contacts 172, conductor 146, contacts 455, 432, through lower winding of relay 480, contacts 486, contacts 461, conductor 139, contacts 171, conductor 138, wiper 467 and its engaged first contact, conductor 456, contacts 363 through relays 320 and 330 to battery. Relay 150, in operating and therefore closing contacts 152, prepares an operating circuit for relay 160. Relay 480, in operating, completes a locking circuit for itself from ground at contacts 172 over its "X" contacts 485. Relay 480, in operating and therefore closing contacts 484, applies ground for maintaining relays 320 and 330 operated.

Relay 330 operates at the same time or slightly ahead of relay 320, thereby preventing relay 340 from operating at this time because of open contacts 331. Relay 320, in operating and therefore closing contacts 321, completes an energizing circuit for relay 300, over the following path: ground at contacts 321, contacts 311, 307, through relay 300 to battery. Relay 320 also, in closing contacts 321, completes a pre-energizing circuit for the upper winding of relay 310 through resistor R4, thereby rendering relay 310 extremely fast to operate. Relay 320, in closing contacts 322 supplies battery potential through the lower winding of 310 to the extra-control wiper 305 for providing means for stopping the voice paging finder when the extra-control wiper 305 encounters the calling line. Relay 320, in closing contacts 323, prepares a circuit for relay 340. Relay 300, in operating and therefore closing contacts 301, completes an obvious energizing circuit for voice paging finder motor magnet 306. Magnet 306, in operating, opens the circuit to relay 300 at contacts 307. Relay 300 therefore restores and in so doing opens the circuit to motor magnet 306 at contacts 301. Motor magnet 306 therefore restores and in so doing again completes the circuit to relay 300. This well-known relay interrupted stepping continues, with the voice paging finder wipers 302 to 305 rotary stepping each time motor magnet 306 restores, until wiper 305 engages the terminal of the calling or paging line. When wiper 305 has stepped to the contact on its bank associated with the calling line, fast acting relay 310 will operate, over the following path: ground at relay 160, through relay 160, conductor 148, contacts 434, conductor 147, contacts 152, 173, regular finder wiper 129 and its engaged contact, conductor 187, cable C190, conductor 187, wiper 305, lower winding of relay 310, contacts 322, resistor R5 to battery. Relay 310 operates before relay 300 has had time to re-operate and therefore opens the circuit to relay 300 at contacts 311. Relay 310, in closing contacts 312, shunts resistor R4 for providing a self-holding circuit for itself via contacts 321 and 312. Relay 310, in closing contacts 313, applies ground through wiper 304 and conductor 186 to line and cut-off relay 40 via cable C190 and contacts 42 in order to maintain that relay operated and to busy substation B to all other calls.

Relay 160, therefore operates and, in opening contacts 161, initiates the release of the illustrated finder-connector link (which has been seized by substation B) by opening the hereinbefore described circuit to relay 100. Relay 100 disconnects the talking conductors of substation B from line relay 120 at contacts 101 and 103. Relay 100, in restoring, also removes ground from contacts 106 allowing relay 170 to restore. Line relay 120 restores and opens the circuit to slow-to-release relay 130. Relay 170 opens the locking circuit of relay 480 at contacts 172 and at contacts 173 opens the circuit to the lower winding of relay 310. Relay 310, however, now remains operated through its upper winding. Relay 170 also, in opening contacts 173, opens the previously described circuit to relay 160, causing it to restore. Relay 480, in restoring and therefore opening contacts 484, removes the holding ground from relays 320 and 330; and in closing contacts 488, prepares the self-interrupted circuit for connector motor magnet 490. Relay 130 has now restored and at contacts 133 completes the self-interrupting circuit for motor magnet 490. Magnet 490 restores wipers 465 to 469 to their "home" position in the manner as described in the previous section, and off-normal springs 475 are thereby opened. Relay 140 therefore restores allowing the finder connector-link to be completely restored and therefore conditioned for handling future calls.

Referring now to the voice paging finder equipment, relay 330 restores ahead of the slow-to-release relay 320, thereby completing an obvious energizing circuit to relay 340 via contacts 323 and 331. Relay 340 therefore operates and, in closing contacts 341 and 342, connects the talking conductors to relay 350. Relay 350 now operates, over the following path: ground, through lower winding of relay 350, contacts 342, conductor 374, wiper 303 and its associated engaged contact, conductor 184, cable C190, conductor 184, positive talking conductor +L, over calling subscriber's loop at substation B, negative talking conductor —L, conductor 183, cable C190, conductor 183, wiper 302, conductor 373, contacts 341, through upper winding of relay 350 to battery. Relay 350, in operating and therefore closing contacts 351, completes an obvious energizing circuit for relay 360. Relay 360 therefore operates and, in closing contacts 361, completes an obvious circuit to relay 540 via conductor 372. Relay 360, in closing contacts 362, applies ground to the control bank of the connector via conductor 456 in order to busy voice pager A to other calls. Relay 360, in opening contacts 363, further opens the circuit to relays 320 and 330. Relay 360, in closing contacts 364, applies an additional ground to mark the calling or paging line B as being in a busy condition; and in closing contacts 365, completes an obvious energizing circuit for relay 340 in order to maintain the calling or paging line connected to voice pager A. The paging subscriber at substation B is now connected to the voice pager A equipment.

Conductors 181 and 182 have been shown in the drawings; but it will be understood that inasmuch as line A is not connected to EC bank 305, said conductors could have been eliminated altogether.

Figure 5:
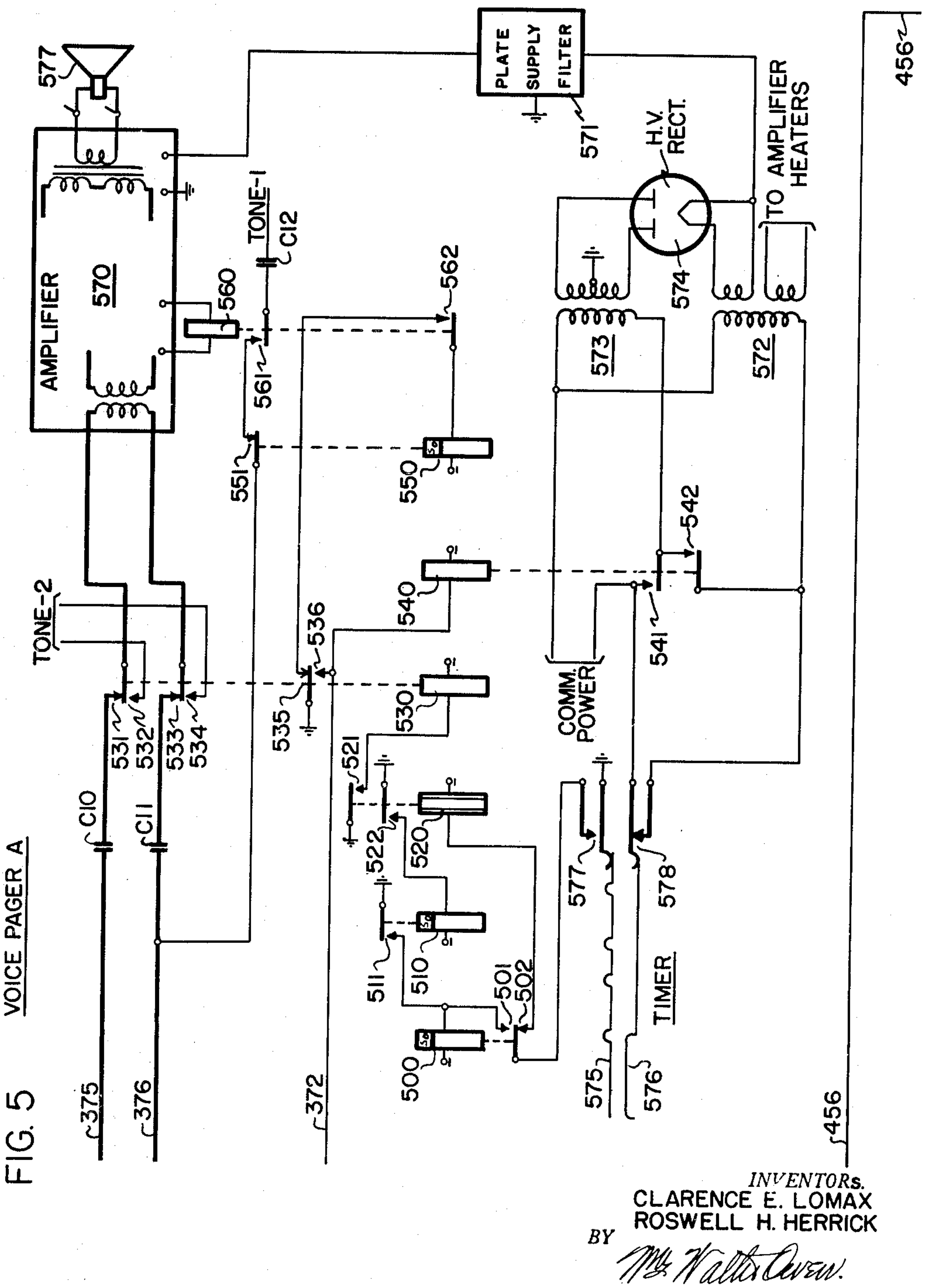
Fig. 5 shows voice pager A.

Before proceeding further, a portion of the timing mechanism will be described. The timer can be considered a unit which makes one revolution every 24 hours. Cam 576 (Fig. 5) opens its springs, namely 578, during the non-working portion of the day only. This allows current to flow through transformer 572 from the power source during the work portion of the day for maintaining a steady supply of filament heating voltage to the rectifier and amplifier tubes. Assuming now that this paging call from substation B is made during the working portion of the day, relay 540, upon operating and therefore closing contacts 541, applies regular commercial power to the high voltage transformer 573. As the filament of this high voltage rectifier is now heated, plate supply voltage through filter 571 will be immediately applied to the amplifier tubes in amplifier 570.

Relay 560 operates responsive to the application of plate voltage to amplifier 570. Relay 560, in closing contacts 561, applies a tone to the amplifier 570, as well as to the calling subscriber on line B. This tone serves three purposes: it indicates to the caller that his line has been found, it tells him that the amplifier is conditioned for immediate paging, and it tells the people in proximity to loudspeaker 577, associated with the amplifier 570, that voice paging will immediately follow. Relay 560 also, in closing contacts 562, energizes relay 550 from ground at contacts 535. Relay 550, being of the slow-to-operate type, opens contacts 551 a short time after the previously described tone has been applied to the line. This tone is, of course, removed by the opening of contacts 551. Paging may now be accomplished by the subscriber at substation B, over the following path: substation B, positive talking conductor +L, conductor 184, cable C190, conductor 184, wiper 303, conductor 374, contacts 342, conductor 376, condenser C11, contacts 533, amplifier input transformer, contacts 531, condenser C10, conductor 375, contacts 341, conductor 373, wiper 302, conductor 183, cable C190, conductor 183, negative talking conductor —L, and back to substation B.

The purpose of the other timer, namely, cam 575, will now be discussed. Cam 575 is included as a means for establishing starting and dismissal signals to the staff, or any other signals that may be desired to communicate. As can be seen from the timer arrangement, these signals will be transmitted during the work portion of the day; thus the rectifier and amplifier tubes will be in a standby condition. From the drawing it also can be seen that springs 577 will be closed at the desired times that signals are to be transmitted. A relay timing arrangement, comprising relays 500, 510 and 520 are included as a means for determining the duration of time that each signal will be transmitted out over the voice pager, irrespective of the period of time that springs 577 close. Relay 520 operates over the following path: ground at springs 577, contacts 502, through relay 520 to battery. Relay 520, in operating and therefore closing contacts 521, causes relay 530 to operate over an obvious circuit. Relay 530, in operating and therefore closing contacts 532 and 534, applies another tone, namely tone 2, to the amplifier 570 for communicating to the staff. Relay 530 also, in closing contacts 536, operates relay 540 for causing application of plate voltage to the amplifier 570. At this time it should be noted that if a subscriber is paging over voice pager A, the paging circuit will be opened at contacts 531 and 533. It should also be noted that relay 530, in opening contacts 535, opens the energizing circuit to relay 550 causing contacts 551 to close, thereby applying tone 1 back to the paging subscriber. This tone 1 will indicate to a paging subscriber that a signal is being communicated to the staff. Returning to relay 520, it will be seen that, in closing contacts 522, relay 510 energizes. Relay 510, in operating and thereby closing contacts 511, causes relay 500 to operate. Relay 500, in operating and thereby closing contacts 501 applies ground from springs 577 to itself. Relay 500, in operating and thereby opening contacts 502, opens the circuit to relay 520. Relay 520 will therefore restore and open contacts 521, causing relay 530 to restore. Relay 530, in restoring, removes signal tone 2 from amplifier 570. Thus, it will be seen that relays 500, 510 and 530 co-operate to limit the time that a signal will be transmitted.

Returning to cam 576, it can be seen that springs 578 will be opened, during the non-work portion of the day. Under these conditions, relay 540, in operating responsive to a paging call, will close the power supply circuit to the filament transformer 572 over contacts 541 and 542. Relay 560 now will be delayed in operating until the rectifier filament and amplifier filaments are sufficiently heated for amplification.

Upon termination of paging, the calling subscriber will, of course, replace the receiver. Relay 350 will therefore restore, causing relay 360 to restore. Relay 360, in restoring and thereby opening contacts 361, releases the voice pager by causing relay 540 to restore. Relay 360, in restoring and therefore opening contacts 362, removes the busy marking from the regular connector; in opening contacts 364, removes busy marking from the calling line's finder; and in opening contacts 365, opens the circuit to relay 340. Relay 340 therefore restores and in opening contacts 341 and 342 opens the circuit to the calling subscriber's line. The voice paging finder is now conditioned for further paging calls over voice pager A.

*Voice paging over voice pager B*

It will be remembered that in order to page over voice pager B the substation that the subscriber desires to page through must be equipped with a non-locking push button, as 47, which will function as a cut-in on busy key. Assuming now that the subscriber at substation B wishes to page over voice pager B, he may do so by dialling the digit 2. The operation of the regular finder and connector will be the same as that described hereinbefore.

However, after the pulsing has been received and connnector motor magnet has advanced wipers 465 to 468 to the second set of contacts, the circuit to relay 470 will be open at contacts 122 by relay 120. Relay 470 therefore restores and, in opening contacts 471, opens the circuit to relay 460. However, relay 460, being of the slow-to-release type, will not restore immediately, thereby providing a time interval to test for busy. Voice pager B is normally marked busy so wiper 467 will encounter ground on its engaged contact. Busy relay 430 will now operate, over the following path: ground at contacts 611, conductor 457, wiper 467, conductor 138, contacts 171, conductor 139, contacts 462, through busy relay 430 to battery. Relay 430, in closing contacts 431, completes a previously traced busy tone circuit to station B; in opening contacts 432, opens the previously traced energizng circuit to the lower winding of relay 480; and in closing contacts 433, prepares a locking circuit for itself. Relay 460 now restores and, in closing contacts 463, completes a locking circuit to relay 430, over the following path: ground at contacts 172, conductor 146, contacts 455, 433, 456, 463, through relay 430 to battery.

At this point it may be stated that if calling subscriber at substation B was calling another line in the exchange and that called line was busy at the time, said callng subscriber could, by the operation of key 47, cut-in on that busy line. This feature is completely described in the pending application, Serial No. 794,601, filed by Clarence E. Lomax, December 30, 1947.

Upon hearing busy tone, the subscriber at substation B depresses the non-locking key 47, thereby completing a circuit to cut-in relay 450, over the following path: ground at key 47, conductor 196, wiper 129, contacts 173, 151, conductor 137, contacts 443, through relay 450 to battery. Relay 450 therefore operates and, in opening contacts 452, removes busy tone from the line. Relay 450, in opening contacts 456, causes relay 440 to operate, over the following path: ground at contacts 611, conductor 457, wiper 467, conductor 138, contacts 171, conductor 139, contacts 454, 433, through relay 440, contacts 463, through relay 430 to battery. Relay 440 therefore operates and, in closing contacts 442 supplies a holding ground for relay 450. Relay 440 also, in closing contacts 441, completes an energizing circuit to relay 600, over the following path: ground at key 47, conductor 196, wiper 129, contacts 173, 151, conductor 137, contacts 441, conductor 427, through relay 600 to battery. Relay 600 operates and, in closing contacts 602, locks to the ground at key 47, by-passng contacts 441. Relay 600 also, in closing contacts 601, completes an obvious energizing circuit for relay 610. Relay 610 operates and, in opening contacts 611, opens the energizing circuits, previously described, to relays 430 and 440. Relay 430 will therefore restore, whereas relay 440, being of the slow-to-release type, will remain operated momentarily. Before relay 440 restores, relay 610, in closing contacts 612, will cause cut-through relay 480 to operate over the following path: ground at contacts 172, conductor 146, contacts 455, 432, through lower winding of relay 480, contacts 486, contacts 461, conductor 139, contacts 171, conductor 138, wiper 467 and its engaged second contact, conductor 457, contacts 612, through resistor R2 to battery. Relay 480, in operating and therefore closing contacts 485, completes a locking circuit for itself from ground at contacts 172 via conductor 146. Relay 480, in closing contacts 482 and 483 connects the talking conductors to conductors 444 and 447 through the wipers of 465 and 466, respectively. Key 47 may now be released, thereby causing relays 600 and 610 to release.

The line is now switched through to voice pager B and ringing current will be transmitted thereto. The ring cut-off relay 420 operates in a manner prevously described over relay 620 and resistance R3, instead of a called subscriber's loop. The back bridge relay 410 therefore operates, as previously described, and supplies battery for operatng relay 620. Relay 620, in operating and therefore closing contacts 621, completes an obvious circuit to relay 630. Relay 630 operates and, in opening contacts 631, removes resistor R3 from the line in order to improve transmission. Relay 630, in closing contacts 632, completes an obvious circuit to relay 690.

The timer mechanism is similar to that described in voice pager A so it will be understood that the rectifier and amplifier tubes will be in a standby condition during the work portion of the day. Relay 690, in operating and therefore closing contacts 691, applies regular commercial power to transformer 613, thereby supplying plate voltage to the amplifier 603. Relay 695 will operate when amplifier 603 is conditioned for amplification. Relay 695, in closing contacts 696, informs the paging subscriber at substation B that paging may be accomplished; and also informs the people in proximity to the voice paging loud speaker 607 that paging is about to begin. Relay 695, in closing contacts 697, completes a circuit to operate relay 640 from ground at contacts 675, via contacts 685 and 697. Relay 695, in closing contacts 698, prepares a circuit for relay 660. Relay 640 being of the slow-to-operate type will not operate immediately, thereby allowing a short duration of time for tone 1 to be impressed on the line before the circuit is open at contacts 641, caused by the operation of relay 640. The subscriber at substation B may now page, over the following circuit: subscriber's loop at substation B, positive talking conductor +L, wiper 127, contacts 103, condenser C2, conductor 136, contacts 425, 483, wiper 466 and its engaged second contact, conductor 447, contacts 673, 683, condenser C9, amplifier input transformer, condenser C8, contacts 681, 671, conductor 444, wiper 645, contacts 482, 422, conductor 135, condenser C1, contacts 101, wiper 126, negative talking conductor —L, and back to the paging subscriber's loop at substation B.

Tone 2 in voice pager B, similar to that described in voice pager A, is amplified out over loud speaker 607 in the same manner hereinbefore described. Relays 650, 660 and 665 function in the same manner as relays 500, 510, and 520, with the exception that relay 695 must now be operated. Relay 670 operates in a similar manner as relay 530 and for a similar purpose. The operation of relay 680, manually operated by key 699, may be used for causing still another class of signals to be transmitted—for example, fire alarm. Relay 680 in operating and therefore closing contacts 682 and 684 applies tone 3 to amplifier 603, predominating over any voice paging or signals in progress at the time.

Upon the termination of paging, the subscriber at substation B replaces the receiver. The finder and connector will release in a manner hereinbefore described. Relay 480 will restore when its holding circuit is opened at contacts 172, opening the circuit to relay 620. Relay 620 will therefore restore and open the circuit to relay 630, causing it to restore. Relay 630 in restoring opens the circuit to relay 690; which in turn causes the removal of plate voltage from the amplifier 603 and rectifier 615. Voice pager B is now conditioned for future paging.

While there has been described what is at present considered to be the preferred embodiment of the invention, it will be understood that various modifications may be made therein, and it is intended to cover in the appended claims all such modifications as fall within the true spirit and scope of the invention.

Having described my invention in detail, what we claim and desire to have protected by issuance of Letters Patent of the United States is:

1. In a telephone system, a voice paging amplifier, a plurality of subscriber lines, a finder-connector link serving all of said lines, a voice paging finder serving certain of said lines, means for marking said certain of said lines at said voice paging finder for distinguishing those lines having access to said voice paging amplifier; means operable responsive to dialling a certain digit over said finder-connector link, when calling from a line that is appropriately marked at said voice paging finder, for causing said voice paging finder to find the calling line; and means operated thereafter for establishing a paging call over said voice paging amplifier from the calling line.

2. In a telephone system as claimed in claim 1, means for causing said finder-connector link to release once the calling line is found by said voice paging finder, thereby freeing said finder-connector link for use by other calls.

3. In a telephone system as claimed in claim 1, means for busying the calling line when in use, and means for busying said voice paging finder when in use.

4. In a telephone system, a plurality of subscriber lines, a finder-connector link serving all of said lines, a voice paging finder serving certain of said lines, a voice paging amplifier connected to said voice paging finder, means for marking certain of said lines at said voice paging finder for electrically distinguishing those lines having access to said voice paging amplifier, means operable responsive to the dialling of a certain digit over said finder-connector link from any of said lines for causing said voice paging finder to search for the calling line, said voice paging finder stopping on the calling line and connecting thereto if said calling line is appropriately marked at said voice paging finder, and means operable responsive to the establishment of a paging call over said voice paging finder and associated amplifier for releasing said finder-connector link for immediate use by other lines.

5. In a telephone system, a plurality of subscriber lines, a finder-connector link for establishing calls between any two of said lines, a voice paging finder having access to certain of said lines, marking means at said voice paging finder associated with each of said certain of said lines for distinguishing those lines having voice paging service, a voice paging amplifier linked to said voice paging finder for effecting voice paging calls from said certain of said lines, means in said finder-connector link operable responsive to dialling a certain digit over any of said lines for causing said voice paging finder to search for the calling line, means in said finder-connector link cooperating with said marking means for causing said voice paging finder to find said calling line if said calling line is appropriately marked by said marking means, means operable responsive to the complete connection of said calling line to said voice paging finder for causing said voice paging finder to switch said calling line therethrough to said voice paging amplifier, said calling line thereafter being directly connected to said voice paging amplifier for subsequent voice paging, and means operable responsive to the establishment of the direct connection to said voice paging amplifier for causing said finder-connector link to release for future service by other of said lines.

6. In a telephone system as claimed in claim 5, additional means operable responsive to the establishment of the direct connection to said voice paging amplifier for causing a first audible signal tone current to be transmitted out over said voice paging amplifier as well as back to the calling subscriber, said first audible signal tone being sent in order to inform the calling subscriber that he may begin paging and also to inform the people within hearing range of the output of said voice paging amplifier that voice paging will immediately follow.

7. In a telephone system as claimed in claim 5, means in said voice paging amplifier operable responsive to the establishment of the direct connection to said voice paging amplifier for causing plate voltage to be applied to the rectifier and amplifier tubes of said amplifier, thereby minimizing the power dissipation of said voice paging amplifier.

8. In a telephone system as claimed in claim 7, timing means in said voice paging amplifier for causing filament voltage to be continuously applied to the rectifier and amplifier tubes thereof only during a certain portion of the day, thereby further minimizing the power dissipation of said voice paging amplifier, said means for applying plate voltage to said tubes also causing filament voltage to be applied to the rectifier and amplifier tubes during other than said certain portion of the day.

9. In a telephone system as claimed in claim 6, additional timing means for causing a second audible signal tone current to be momentarily transmitted out over said voice paging amplifier at various predetermined times of the day, means controlled by said additional timing means for momentarily disconnecting any calling line that may be connected to said voice paging amplifier during the transmission of said second signal tone current, and means also controlled by said additional timing means for causing said first audible signal tone current to be transmitted back to the calling subscriber to indicate that said second signal tone current is being transmitted over said voice paging amplifier at that time.

10. In a telephone system, a plurality of subscriber lines, a plurality of substations on said lines, means at each substation for transmitting a series of impulses corresponding to different digits, a finder-connector link for establishing calls between any two of said lines, a voice paging amplifier accessible to said finder-connector link, means in said finder-connector link operated in response to the receipt of a predetermined digit sent by a calling subscriber for connecting said voice paging amplifier to said finder-connector link, means normally preventing the calling line from being connected to said voice paging amplifier after said finder-connector link has connected thereto, manually controlled means at certain of said substations for controlling said preventing means; said preventing means operated in response to operation of said control means at certain of said substations for establishing a complete connection from the calling substation to said voice paging amplifier for subsequent voice paging.

11. In a telephone system as claimed in claim 10, a source of audible signal tone current, additional means operable responsive to the operation of said preventing means for connecting said source of audible signal tone current to the line to be transmitted to said voice paging amplifier and to said calling substation, said tone being sent to signal the calling subscriber to begin paging and also to signal the people within hearing range of the output of said voice paging amplifier that voice paging will immediately follow.

12. In a telephone system as claimed in claim 10, means in said voice paging amplifier operable responsive to connection of said finder-connector link to said amplifier for causing plate voltage to be applied to the rectifier and the amplifier tubes of said voice paging amplifier, thereby minimizing the power dissipation of said voice paging amplifier during standby periods.

13. In a telephone system as claimed in claim 12, timing means in said voice paging amplifier, said timing means effective for causing filament voltage to be continuously applied to the rectifier and amplifier tubes of said amplifier only during a certain portion of the day, said means for applying plate voltage to said tubes also causing filament voltage to be applied to the rectifier and amplifier tubes during other than said certain portion of the day.

14. In a telephone system as claimed in claim 11, a second source of audible signal tone current, additional timing means, said additional timing means effective for connecting said second source of audible signal tone current to said line to be momentarily transmitted out over said voice paging amplifier at various predetermined times of the day, means controlled by said additional timing means for momentarily disconnecting any calling line that may be connected to said voice paging amplifier during the transmission of said second signal tone current, and other means also controlled by said additional timing means for connecting said first audible signal tone current to said line to be transmitted back to the calling subscriber to indicate that said second signal tone is being transmitted over said voice paging amplifier at that time.

15. In a telephone system as claimed in claim 10, a source of audible signal tone current, additional connecting means, said additional connecting means manually operated for connecting said source of audible signal tone current to said voice paging amplifier for special signalling at any time of the day.

16. In a telephone exchange, a plurality of lines, a plurality of substations on said lines, a first voice paging system, a second voice paging system, connecting means associated with said first voice paging system, said connecting means having access only to certain of said lines, switching means for extending connections from said lines, means at each substation for transmitting a series of impulses over said connection corresponding to different digits, said switching means operated in response to the transmission of a particular series of impulses for operating said connecting means and causing it to seize only one of said certain lines and connect it to said first voice paging system, a control means at certain of said substations, and means controlled by the operation of said control means for controlling said switching means to permit the connection only of said substations having said control means to said second voice paging system for establishing voice paging calls thereof.

17. In a telephone exchange, a plurality of lines, a plurality of substations on each line, a plurality of voice paging systems, switching means having access to said lines, means responsive to a call from any of said substations for operating said switching means to extend a connection therefrom, connecting means for extending connections from said lines to one of said voice paging systems, means in said switching means controlled from any of said substations for causing the operation of said connecting means, said connecting means effective when operated to connect with only certain of said lines, means in said switching means for extending connections from any line to another of said voice paging systems, and control means at only certain of the substations for completing one of said last extended connections.

18. In a telephone exchange, a plurality of lines, a plurality of substations on said lines, means at said substations for transmitting series of impulses corresponding to different digits, a first voice paging system, a second voice paging system, means for connecting certain of said lines to said first voice paging system, switching means, said switching means operated in response to the receipt of a particular series of impulses for controlling the operation of said connecting means to connect certain lines to said first voice paging system, control means at certain substations, said control means momentarily operated by a subscriber at any of said certain substations to control the operation of said switching means, said switching means effective in response to said control for connecting said calling subscriber with said second voice paging system.

19. In a telephone exchange, a line, a plurality of substations on said line, means at said substations for transmitting series of impulses corresponding to different digits, a plurality of voice paging systems, all of said substations having access to one common voice paging system, certain of said substations having access to all of said voice paging systems, means for extending a connection from said line, means operated in response to said extension for connecting said line to said common voice paging system, means effective in response to said connection for releasing said extending means for other service, control means at said certain substations, said extending means operated in response to the receipt of a different series of impulses for extending a connection to another of said voice paging systems, said control means operated at said certain substations to control the operation of said extending means, said extending means effective in response to said control for establishing connection between said calling line and said other voice paging systems.

20. In a telephone system, a plurality of lines, a plurality of substations on said lines, a finder-connector link for establishing calls between any two of said lines, a voice paging amplifier, said finder-connector link having access to said voice paging amplifier, means at said substation for transmitting over said lines series of impulses corresponding to various digits, said finder-connector link operated in response to the receipt of impulses corresponding to a predetermined digit for extending said calling line to said voice paging amplifier, busy indicating means, said busy indicating means effective in response to said extension of the line to deny connection to said voice paging amplifier, control means at certain of said substations, said control means operated at said calling certain substation to remove said busy indicating means and to effect a connection of said calling line to said voice paging amplifier.

References Cited in the file of this patent

UNITED STATES PATENTS

| Number | Name | Date |
|---|---|---|
| 1,586,554 | Goodrum | June 1, 1926 |
| 2,397,881 | Nitterauer | Apr. 2, 1946 |
| 2,494,475 | Hersey | Jan. 10, 1950 |